United States Patent
Wagner et al.

(10) Patent No.: US 10,511,017 B2
(45) Date of Patent: Dec. 17, 2019

(54) HOLLOW CARBON NANOSPHERE COMPOSITE BASED SECONDARY CELL ELECTRODES

(71) Applicant: The George Washington University, Washington, DC (US)

(72) Inventors: Michael Wagner, Rockville, MD (US); Nathan Banek, Arlington, VA (US); Kevin Hays, Washington, DC (US)

(73) Assignee: The George Washington University, Washington, DC (US)

( * ) Notice: Subject to any disclaimer, the term of this patent is extended or adjusted under 35 U.S.C. 154(b) by 86 days.

(21) Appl. No.: 15/138,787

(22) Filed: Apr. 26, 2016

(65) Prior Publication Data

US 2016/0351894 A1   Dec. 1, 2016

Related U.S. Application Data

(60) Provisional application No. 62/167,020, filed on May 27, 2015.

(51) Int. Cl.
| | |
|---|---|
| H01M 4/36 | (2006.01) |
| H01M 10/0525 | (2010.01) |
| H01M 4/587 | (2010.01) |
| H01M 4/38 | (2006.01) |
| H01M 4/62 | (2006.01) |

(52) U.S. Cl.
CPC ............ *H01M 4/364* (2013.01); *H01M 4/38* (2013.01); *H01M 4/587* (2013.01); *H01M 10/0525* (2013.01); *H01M 4/622* (2013.01); *H01M 4/625* (2013.01)

(58) Field of Classification Search
CPC ................................ B82Y 30/00; C01B 31/04
USPC ............................ 252/502; 428/402; 216/39
See application file for complete search history.

(56) References Cited

U.S. PATENT DOCUMENTS

| | | |
|---|---|---|
| 6,280,697 B1 | 8/2001 | Zhou et al. |
| 7,601,321 B2 | 10/2009 | McKinnon et al. |
| 8,262,942 B2 | 9/2012 | Wagner et al. |
| 2004/0265210 A1 | 12/2004 | Shinohara et al. |
| 2006/0278159 A1 | 12/2006 | Gregory et al. |
| 2009/0200518 A1 | 8/2009 | Wagner et al. |

(Continued)

FOREIGN PATENT DOCUMENTS

| | | | | |
|---|---|---|---|---|
| CN | 1851961 A | * | 10/2006 | ............... B22F 1/02 |
| CN | 102600835 | * | 7/2012 | ............. B01J 23/42 |
| JP | 2011057541 A | * | 3/2011 | ............. C01B 31/02 |

OTHER PUBLICATIONS

Wang et al., "Crystalline Carbon Hollow Spheres, Crystalline Carbon-$SnO_2$ Hollow Spheres, and Crystalline $SnO_2$ Hollow Spheres: Synthesis and Performance in Reversible Li-Ion Storage", Chem. Mater. vol. 18, No. 5, 2006, pp. 1347-1353.

(Continued)

*Primary Examiner* — Khanh T Nguyen
(74) *Attorney, Agent, or Firm* — Blank Rome LLP

(57) ABSTRACT

The present disclosure relates to composites of hollow carbon nanospheres (HCNS) and a metal, a metalloid, an alloy, a compound thereof, or any combination of the foregoing, and the use of such composites for making ion storage materials, such as negative electrode active material for lithium ion batteries.

35 Claims, 8 Drawing Sheets

(56) References Cited

U.S. PATENT DOCUMENTS

| | | | | |
|---|---|---|---|---|
| 2012/0328880 A1* | 12/2012 | Asano | ............... | A61K 9/5089 428/402 |
| 2015/0030930 A1 | 1/2015 | Archer et al. | | |
| 2015/0246816 A1* | 9/2015 | Liu | ............... | H01M 4/13 216/39 |
| 2016/0351894 A1 | 12/2016 | Wagner et al. | | |

OTHER PUBLICATIONS

Lou et al., "Designed Synthesis of Coaxial $SnO_2$@carbon Hollow Nanospheres for Highly Reversible Lithium Storage", Advanced Materials, vol. 21, No. 24, 2009, pp. 2536-2539.

Nitta, et al., "High-Capacity Anode Materials for Lithium-Ion Batteries: Choice of Elements and Structures for Active Particles", Particle and Particle Systems Characterization, vol. 31, No. 3, 2014, pp. 317-336.

Besenhard et al., "Will Advanced Lithium-Alloy Anodes Have a Chance in Lithium-Ion Batteries?", Journal of Power Sources, vol. 68, No. 1, 1997, pp. 87-90.

Park et al., "Li-alloy Based Anode Materials for Li Secondary batteries", Chemical Society Reviews, vol. 39, No. 8, 2010, pp. 3115-3141.

McDowell, et al., "25th Anniversary Article: Understanding the Lithiation of Silicon and Other Alloying Anodes for Lithium-Ion Batteries", Advanced Materials, vol. 25, No. 36, 2013, pp. 4966-4984.

International Search Report and Written Opinion for PCT/US16/29343, dated Jul. 27, 2016, 9 pages.

B. R. Ortiz, et al., "Potential for High Thermoelectric Performance in N-type Zintl Compounds: a case study of Ba Doped $KAISb_4$", Royal Society of Chemistry, vol. 5, Jan. 2017, pp. 4036-4046.

International Search Report and Written Opinion for PCT/US2017/055069 dated Dec. 14, 2017, 9 pages.

* cited by examiner

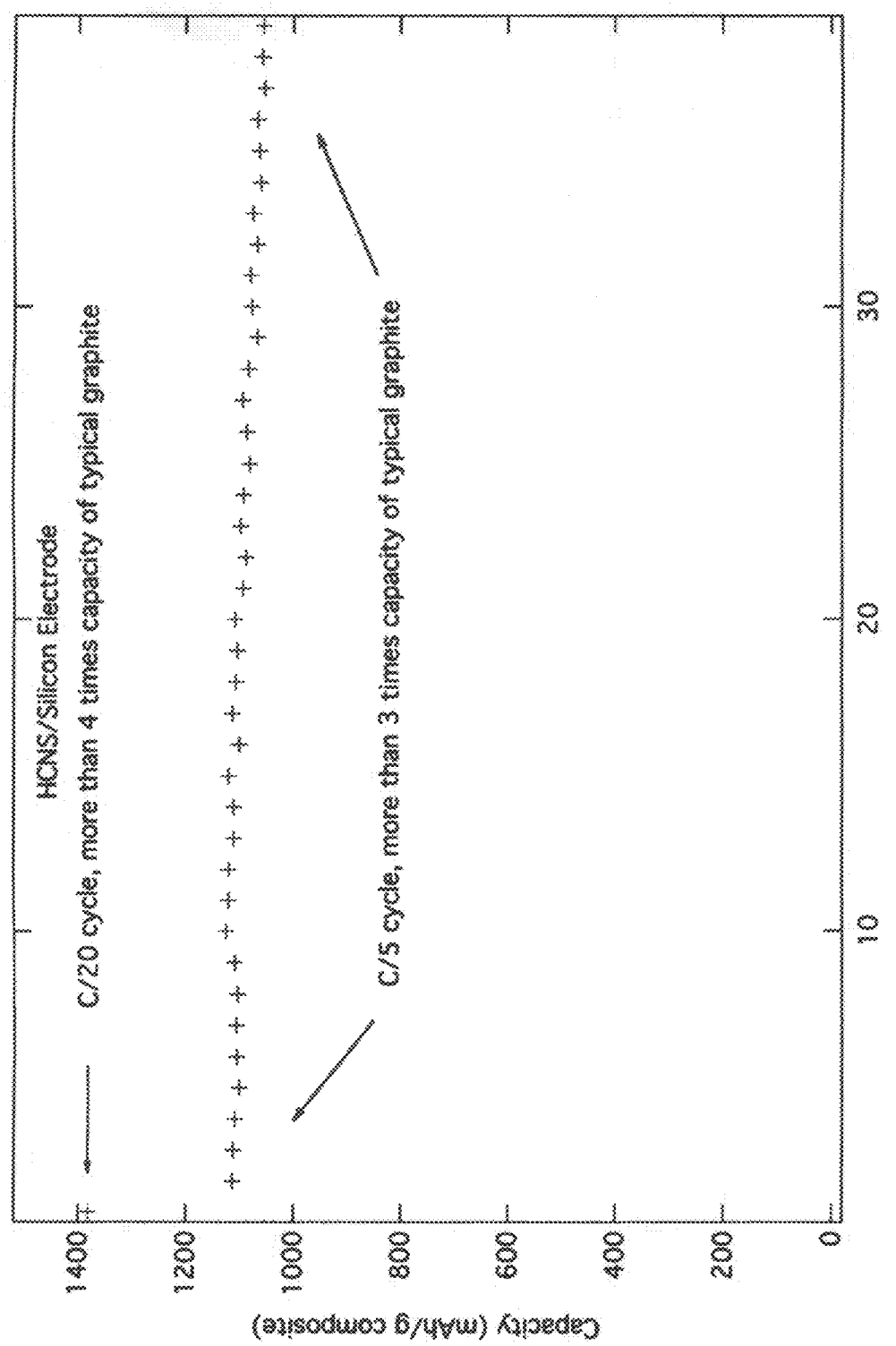

HOLLOW CARBON NANOSPHERE COMPOSITE BASED SECONDARY CELL ELECTRODES

CROSS REFERENCE TO RELATED APPLICATIONS

This application claims the benefit of U.S. Provisional Application No. 62/167,020, filed May 27, 2015, the entire contents of which are hereby incorporated by reference.

STATEMENT REGARDING FEDERALLY SPONSORED RESEARCH OR DEVELOPMENT

At least some aspects of this invention were made with Government support under CIA Grant Nos. 2010*1044607*000 and 2012-12040900005 and NRO Grant No. 000-14-C-0335. The Government may have certain rights in this invention.

FIELD OF THE INVENTION

The present invention relates to composites of hollow carbon nanospheres (HCNS) and a metal, a metalloid, an alloy, a compound thereof, or any combination of the foregoing, and the use of such composites for making ion storage materials, such as negative electrode active material for lithium ion batteries. Hollow carbon nanospheres are useful for making quick-charge and discharge lithium ion batteries, providing an alternative technology to address functional needs at the battery/capacitor intersection.

BACKGROUND OF THE INVENTION

Graphite is the most popular anode for lithium ion batteries used in consumer electronics. However, it has poor charging rates and is unable to cycle in inexpensive, low temperature melting solvents such as propylene carbonate and tetrahydrofuran.

Hollow carbon nanospheres have the ability to charge at much higher rates and at much lower temperatures than graphite and greatly exceed the energy storage capacity of graphite when used to support Li-alloying or Li-compound forming materials. Graphitic hollow carbon nanospheres (HCNS) contain void spaces to alleviate local expansion of lithium alloying or compound formation, allowing for a high degree of charge/discharge reversibility (i.e. long battery life). See, e.g., U.S. Pat. Nos. 6,280,697 and 8,262,942, and U.S. Publication Nos. 2006/0278159 and 2004/0265210.

Lithium alloying metals have been applied to various rigid supports. See, e.g., Nitta et al., *Particle & Particle Systems Characterization*, 31(3), 317-336, 2014; McDowell et al., *Advanced Materials*, 25(36), 4966-4984, 2013; Besenhard et al., *Journal of Power Sources*, 68(1), 87-9, 1997; and Park et al., *Chemical Society Reviews*, 39(8), 3115-3141, 2010. However, anodes for lithium ion batteries made with such materials generally suffer from severe reversible capacity loss in subsequent cycles and thus short cycle life likely due to the very large expansion (as much as 400%) that the materials undergo upon lithiation, which causes physical degradation of the electrode, disrupting electrical conductivity paths from the current collector to the lithium alloying material rendering it inactive for reversible storage. As such, none have been successful in achieving stable performance over multiple (hundreds) charge/discharge cycles.

There is therefore a need for new materials that may be used as electrode active materials that exhibit enhanced performance, such as stability over multiple charge/discharge cycles.

SUMMARY OF THE INVENTION

The present invention relates to composites of hollow carbon nanospheres (HCNS) and a metal, a metalloid, an alloy, a compound thereof, or any combination of the foregoing, and the use of such composites as electrode active materials, e.g., negative electrode active materials for lithium ion batteries.

The present inventors have surprisingly found that batteries prepared using the HCNS composites described herein exhibit at least one or more of the following superior properties, when compared to other materials:

i) They achieve hundreds of charge/discharge cycles with little charge capacity loss;

ii) they achieve high Coulombic efficiency both initially and throughout the cycle life. Low Coulombic efficiency kills batteries in real world applications due to the limited electrolyte and cathode supply in real cells;

iii) The cells can be cycled in relatively inexpensive electrolytes, such as propylene carbonate and tetrahydrofuran, allowing for low temperature operation;

iv) The cells are able to charge at very high rate due to the very high dispersion of and small size of the alloying metal, as well as the short diffusion distances of HCNS; and v) The hollow interior of the HCNS is accessible through a hole in their shells. Metals, metalloids, alloys, compounds thereof, or any combination of the foregoing that are deposited inside these spheres are further protected from agglomeration with that outside the sphere and that in other spheres by their physical separation.

Thus, in one aspect, the present invention relates to an ion storage material comprising a composite of hollow carbon nanosphere material and a metal, a metalloid, an alloy, a compound thereof, or any combination of the foregoing.

In another aspect, the present invention relates to a lithium ion storage material comprising a composite of hollow carbon nanosphere material and a metal, a metalloid, an alloy, a compound thereof, or any combination of the foregoing.

In certain embodiments, the weight percentage of hollow carbon nanosphere material within any of ion storage materials described herein (such as a lithium ion storage material) is no less than about 5%, such as no less than about 10%, no less than about 15%, no less than about 20%, no less than about 25% or no less than about 30%. In one embodiment, the weight percentage of hollow carbon nanosphere material within any of ion storage materials described herein (such as a lithium ion storage material) is less than about 99%, such as less than about 95%.

In certain embodiments, the weight percentage of hollow carbon nanosphere material within any of ion storage materials described herein (such as a lithium ion storage material) ranges between about 5% and about 95%, such as between about 10% and about 95%, between about 20% and about 95%, between about 30% and about 95%, between about 50% and about 80%, between about 10% and about 80%, or between about 20% and about 80%, between about 30% and about 80%, between about 5% and about 75%, between about 10% and about 75%, between about 20% and about 75%, between about 30% and about 75%, between about 5% and about 70%, between about 10% and about 70%, between about 20% and about 70%, or between about 30% and about 70%.

In certain embodiments, the weight percentage of hollow carbon nanosphere material within any of ion storage materials described herein (such as a lithium ion storage material) is about 5%, about 10%, about 15%, about 20%, about 25% or about 30%.

In certain embodiments, the weight percentage of hollow carbon nanosphere material within any of ion storage materials described herein (such as a lithium ion storage material) is greater than about 5%, such as greater than about 10%, greater than about 15%, greater than about 20%, greater than about 25% or greater than about 30%.

In additional embodiments, the weight percentage of metal, metalloid, alloy, compound thereof, or any combination of the foregoing, in any of ion storage materials described herein (such as a lithium ion storage material) is no less than about 5%, such as no less than about 10%, no less than about 15%, no less than about 20%, no less than about 25% or no less than about 30%.

In additional embodiments, the weight percentage of metal, metalloid, alloy, compound thereof, or any combination of the foregoing, within any of the ion storage materials described herein (such as a lithium ion storage material) is greater than about 5%, such as greater than about 10%, greater than about 15%, greater than about 20%, greater than about 25% or greater than about 30%.

In additional embodiments, the weight percentage of metal, metalloid, alloy, compound thereof, or any combination of the foregoing, in any of ion storage materials described herein (such as a lithium ion storage material) is about 5%, about 10%, about 15%, about 20%, about 25% or about 30%.

Suitable metals, metalloids, alloys, and compounds thereof for use in any of ion storage materials described herein (such as a lithium ion storage material) include, but are not limited to, those of As, Si, Ge, Ga, GaAs, Sn, Pb, Bi, Zn, Te, Sb, Al, In, Cd, Au, Ag, Co, Ni, V, Mo, W, Nb, Ta, and Ti, and any combination of the foregoing. Suitable compounds include, but are not limited to chalconides thereof (e.g., oxides, suphides, selenides, tellurides, and any combination thereof), pnictides thereof (e.g., nitrides, phosphides, arsenides, antimonides, and any combination thereof), halides thereof (e.g., fluorides, chlorides, bromides, iodides, and any combination thereof), borides thereof, and other compounds, and any combination of the foregoing. The present invention contemplates the use of one or more metal, one or more metalloid, one or more alloy, and/or one or more compound, in any combination of the foregoing.

In one embodiment, the metal is not an alkali metal. In another embodiment, the metal is not potassium or sodium.

In one embodiment, the metal is not germanium. In one embodiment, the metal, metalloid, alloy, or compound thereof does not comprise germanium.

In another embodiment, any of ion storage materials described herein (such as a lithium ion storage material) further comprises a binder.

Suitable binders include, but are not limited to, polymeric binders such as polyvinylidene fluoride, hexafluoropropylene, polyethylene, polyethylene oxide, polypropylene, polytetrafluoroethylene, polyacrylates, alginates, substituted derivatives thereof, copolymers thereof and any other suitable combinations thereof. An exemplary binder that is suitable for combining with a HCNS composite/conductive additive mixture according to any of the embodiments described herein is polyacrylic acid. Another exemplary binder that is suitable for combining with a HCNS composite/conductive additive mixture according to any of the embodiments described herein is polyvinylidene fluoride hexafluoropropylene (PVDF-HFP).

In one embodiment, the amount of binder in any of ion storage materials described herein (such as a lithium ion storage material) is about 1% to about 20% by weight, such as about 1 to about 15% by weight.

In yet another embodiment, any of ion storage materials described herein (such as a lithium ion storage material) further comprises a carbonaceous material.

Suitable carbonaceous materials include, but are not limited to, graphite, lamellar graphite, pitch, coal pitch, coke, carbon black and/or other electrical conducting carbon materials, carbon-arc generated soot, and any combination thereof. In one embodiment, the amount of carbonaceous material in the ion storage material is about 1% to about 20% by weight, such as about 1 to about 15% by weight.

In another embodiment, any of ion storage materials described herein (such as a lithium ion storage material) has a reversible capacity greater than about 400 mAh/g, such as 500 mAh/g, greater than about 600 mAh/g, greater than about 700 mAh/g, greater than about 800 mAh/g, greater than about 900 mAh/g, greater than about 1000 mAh/g, greater than about 1100 mAh/g, greater than about 1200 mAh/g, greater than about 1300 mAh/g, greater than about 1400 mAh/g, greater than about 1500 mAh/g, greater than about 2000 mAh/g, greater than about 2500 mAh/g, greater than about 3000 mAh/g, greater than about 3500 mAh/g or, greater than about 4000 mAh/g.

In another aspect, the present invention relates to an electrode comprising any of ion storage materials described herein (such as a lithium ion storage material). In one embodiment, the electrode further comprises a current collector associated with the ion storage material. Suitable current collectors include, but are not limited to, copper or nickel metal, including alloys thereof, coated or uncoated carbon, carbon nanotubes, carbon fiber sheets, and the like. In one embodiment, the current collector is copper.

In one embodiment, the ion storage material forms a layer on the current collector.

In one embodiment, the electrode is included within a secondary ion battery. Thus, in another aspect, the present invention relates to a secondary ion battery comprising an electrode according to any of the embodiments described herein.

BRIEF DESCRIPTION OF THE DRAWINGS

FIG. 8 is a diagram showing the reversible capacity of an electrode prepared from a composite of hollow carbon nanospheres (HCNS) and silicon.

DETAILED DESCRIPTION OF THE INVENTION

Hollow Carbon Nanospheres

U.S. Pat. No. 7,601,321, which is hereby incorporated by reference in its entirety, describes the synthesis of carbon nanospheres by laser pyrolysis.

Figure 1:
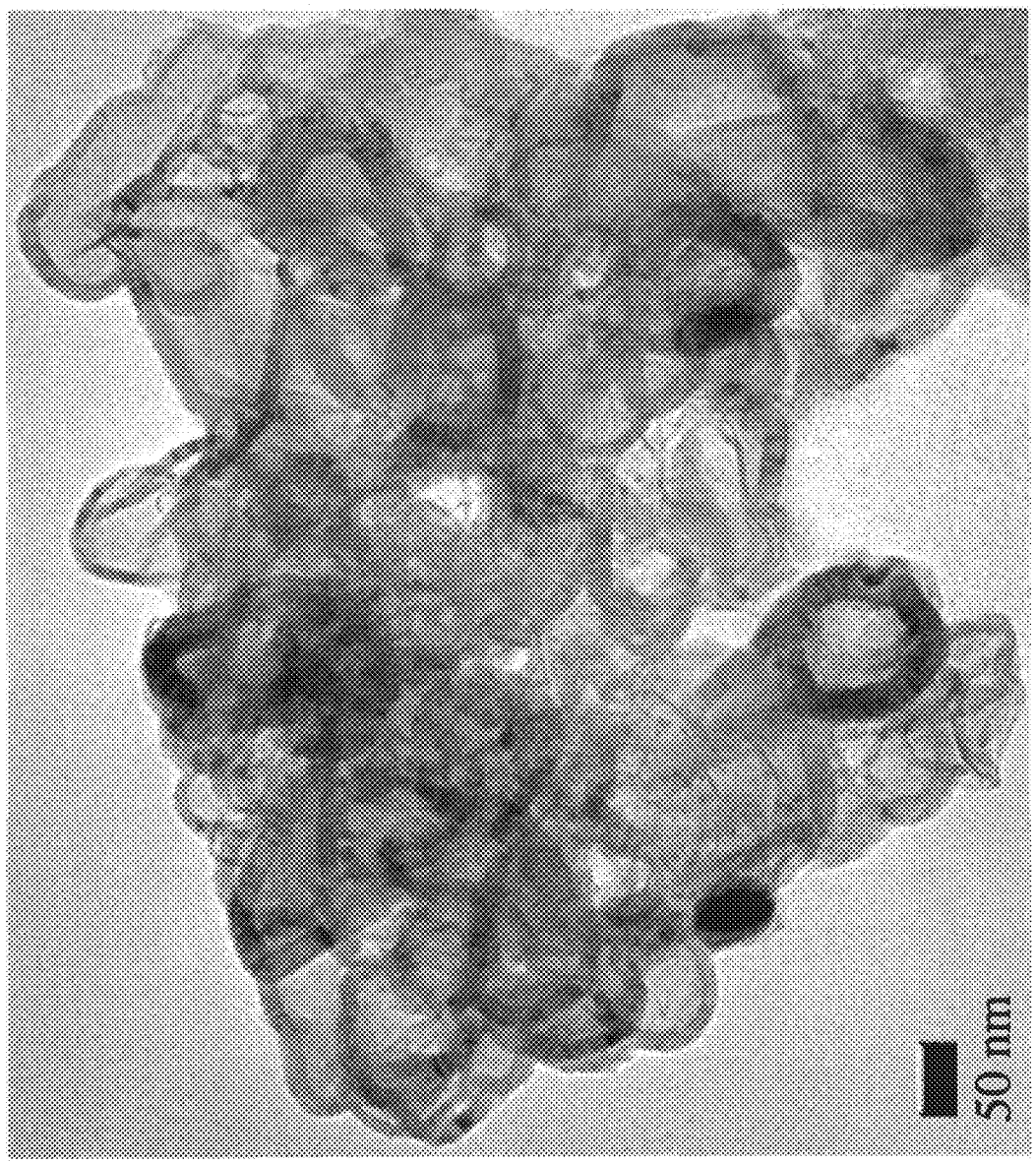
FIG. 1 is a Transmission Electron Microscope (TEM) image showing hollow carbon nanospheres (HCNS).

Hollow carbon nanospheres (HCNS) are materials composed of highly crystalline concentric graphene sheets surrounding a hollow core that can range in diameter from less than 10 to many hundreds of nanometers, depending on the preparation route. See FIG. 1. They may be obtained by heating a carbon source (e.g., by laser pyrolysis or other heating source such as autoclaving, plasma torches, and arc lamps) using nickel or other metals (especially 3d transition metals such as iron or cobalt) as a templating catalyst. The carbon source can be cellulose, wood pulp, organic polymers, or other appropriate material.

Figure 2:
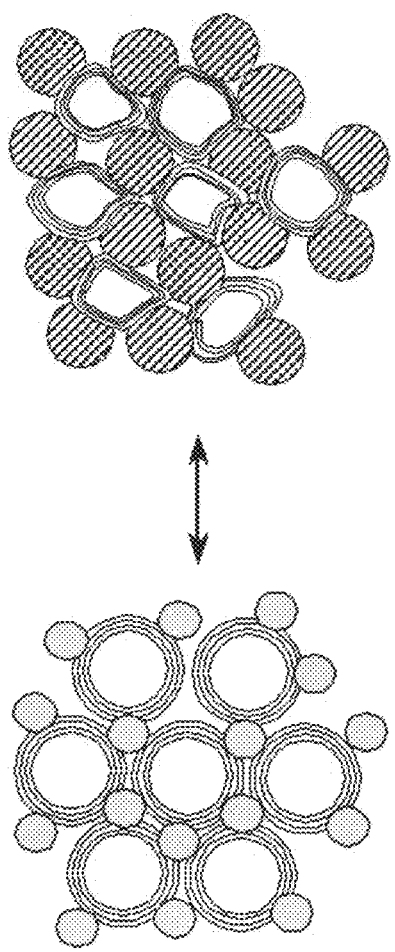
FIG. 2 depicts a proposed mechanism by which a metal, a metalloid, an alloy, compound thereof, or any combination of the foregoing, located in the interstices between the HCNS could have room to expand/contract during lithiation/delithiation without loss of contact to the HCNS walls or physical disruption of an electrode due to reversible distortion on the walls of the HCNS.

Without wishing to be bound by theory, the inventors theorize that a metal, a metalloid, an alloy, compound thereof, or any combination of the foregoing, located within the interior of the HCNS could have room to expand/contract during lithiation/delithiation without loss of contact to the HCNS walls or physical disruption of the electrode. Furthermore, it is theorized that if these same storage materials are located on the exterior of the spheres, i.e., in between adjacent HCNS, flexing of the HCNS walls (a "pillowing" effect) accommodates the huge volume changes (up to 400%) of the alloying metals when lithiated/delithiated, so that the alloying metals do not, unlike other supports such as carbon black, agglomerate, grow in size and disrupt the physical/electrical integrity of the cell. This effect is illustrated in FIG. 2.

Any suitable method can be utilized to mix the HCNS with a conductive additive and binder material to form a generally uniform and homogeneous electrode composition.

In an exemplary method, hollow carbon nanospheres (HCNS) were synthesized using a two-step pyrolysis technique.

The carbon source for the HCNS synthesis was from Avicel® cellulose, a highly crystalline form of the wood-derived biopolymer. The preferred catalyst was nickel chloride, a water-soluble nickel salt that readily forms a homogeneous mixture with Avicel® via an incipient wetness technique. To prepare the metal-doped cellulose mixture, nickel chloride was dissolved completely in water then Avicel® was added to the solution at a weight ratio of 2 grams Avicel® per 1 gram of fully hydrated nickel salt. The mixture was oven-dried at 85° C. in air for 2 days. The resulting metal-doped Avicel® was a homogeneous green powder. To prepare for the two-step pyrolysis sequence, the powder was compressed into thin, cylindrical wafers of approximately 5 g using a pellet press with 10,000 psi force.

The first pyrolysis step was a long-duration, low-temperature char sequence. The doped Avicel® pellets were placed in a tube furnace under a slow flow of argon. The furnace temperature was raised to 375° C. via a steady 20 minute ramp from room temperature. Upon reaching its set point, the furnace temperature was constant for 30 minutes during which time the Avicel® pellet was converted into a char disk largely composed of polycyclic aromatic hydrocarbon moieties surrounding spherical nickel chloride particles of approximately 30 nm diameter. Following the charring procedure, the char pellets were immediately removed from the furnace and allowed to cool to room temperature under an argon atmosphere.

The second pyrolysis step was a short-duration, high-temperature laser sequence. A carbon dioxide laser was used as a source for extremely concentrated 10.6 μm infared radiation. The entire 61.5 W laser output was focused into a beam of approximately 1 mm diameter at the pellet surface.

During laser pyrolysis, the char disks were rotated through the incident laser beam, allowing the laser to pyrolyze the entirety of the pellet's circumference and producing HCNS. Following the laser pyrolysis, the HCNS are present in the solid phase of the char matrix.

Following the pyrolysis production, a two-step purification process was employed to prepare HCNS for battery applications.

The first purification step was a nitric acid digestion in which the majority of the material not converted to HCNS is removed. Most of this material is amorphous carbon. The outer edges of the pyrolyzed char disk were cut off and ground into a fine powder using a mortar and pestle. The char powder was added to a flask of 70% nitric acid at a ratio of 3 g char per 100 ml of acid. The acid is heated to reflux for 5 hours. After the reflux was complete, the acid was filtered onto a fine-pored ceramic frit, separating the HCNS from the acid. Two water washes were passed through the frit to remove residual nitric acid. The deposited HCNS were allowed to dry overnight at room temperature, then removed from the frit.

The second step of the HCNS purification procedure employed an ultrasonication process. The HCNS powder was suspended in water at a ratio of up to 10 g HCNS per 100 ml of water. The suspension was placed in an ultrasonic bath for 2 hours. Following sonication, the suspension was filtered onto a ceramic frit. HCNS are retained on the frit. Frit-captured HCNS were washed off the frit using a water/acetone mixture. The wash was saved and evaporated, leaving behind the HCNS.

Composites of HCNS material and a metal, a metalloid, an alloy, a compound thereof, or any combination of the foregoing, can be made by any number of synthetic or physical procedures known to a person of ordinary skill including, but not limited to, chemical, electrochemical, vapor, sputtering, and/or chemical vapor deposition onto the HCNS. Alternatively, the composite can be made by physically combining the HCNS with a metal, a metalloid, an alloy, a compound thereof, or any combination of the foregoing, by milling, grinding or mixing.

Electrode Preparation

Electrodes can be made with or without an electrically conductive additive mixed with the composite of HCNS material and a metal, a metalloid, an alloy, a compound thereof, or any combination of the foregoing. Any suitable conductive additive can be utilized including without limitation conductive carbons (carbon black, graphite, lamellar graphite, mesoscopic carbons, pitch, coal pitch, coke or any other electrically conducting carbon materials), metals and alloys. An exemplary conductive additive is carbon black.

Any suitable method can be utilized to combine the HCNS and the conductive additive including, without limitation, mechanical milling, grinding and agitation in a slurry. In an exemplary method, HCNS and carbon black were combined and thoroughly mixed by agitation in a slurry.

Any suitable binder material may be utilized including, without limitation, polymeric binders such as polyvinylidene fluoride, hexafluoropropylene, polyethylene, polyethylene oxide, polypropylene, polytetrafluoroethylene, polyacrylates, alginate, substituted derivates thereof, copolymers and any other suitable combinations thereof. An exemplary binder that is suitable for combining with a HCNS composite/conductive additive mixture according to any of the embodiments described herein is polyacrylic acid. The amount of binder material to be provided in the electrode composition is, in one embodiment, about 1% to about 15% by weight of the electrode composition.

Electrode Compositions

Any suitable method may be utilized to sufficiently combine the binder material with the HCNS composite to form a generally uniform and homogenous electrode composition. In an exemplary method, the binder material is first dissolved in a solvent (such as water, ethyl acetate, cyclopentanone, 1-methyl-2-pyrrolidinone, and/or other suitable solvent, or combination thereof), followed by the addition of the HCNS/metal, metalloid, alloy, or any combination thereof/conductive additive composite to the solvent. The HCNS/metal, metalloid, alloy, or any combination thereof, composite and the conductive additive are combined with the binder materials in the solvent utilizing any suitable process (e.g., agitation, sonication, etc.) A slurry is formed including the mixed HCNS/metal, metalloid, alloy, or any combination thereof/conductive additive mixture and binder materials and the solvent, and this slurry is uniformly applied (e.g., via a doctor blade) to a current collector or other suitable substrate to form the electrode. The electrode is then dried for a sufficient period of time and preferably at ambient pressure or suitable vacuum (e.g., about $10^4$ kPa) and ambient or elevated temperature to substantially remove the solvent and any other residual moisture from the composition.

The formed electrode can be made more homogenous, compact and physically robust by any number of methods including, without limitation, mechanically pressing or processing through a rolling mill. In an exemplary process, the electrode is cold pressed (e.g., at about room temperature) at a suitable pressure (e.g., between about 200 kilopascals (kPa) and about 300 megapascals (MPa)) and for a sufficient time (e.g., between about 1 second and about 8 hours) prior to being implemented for use in a lithium ion battery.

Characterization

A useful physical parameter that provides an indication of the operational performance of the anode and the lithium ion battery is the reversible capacity of the battery. The reversible capacity, described in units of milliamp hours per gram or mAh/g, represents the amount of lithium ions per gram weight of active material (i.e., the amount of the electrode composition provided in the electrode) that is removed or deintercalated from the anode during a discharging cycle of the battery (i.e., after loading cycle and intercalation of the anode have occurred). In other words, the reversible capacity provides an indication of the charge that can be delivered by the battery during a particular cycle.

Another useful physical parameter is the cycle life of the battery. The cycle life is generally defined as the number of times a battery can be fully charged and fully discharged (a charge/discharge cycle) before its reversible charge capacity decreases below some percentage of its initial (first cycle) reversible charge capacity.

In one embodiment, a secondary ion battery (such as a lithium secondary ion battery) according to any of the embodiments described herein exhibits substantially no (e.g., less than about 20%, less than about 15%, less than about 10%, less than about 5%, less than about 4%, less than about 3%, less than about 2%, or less than about 1%) or no decrease in charge capacity when cycled over about 100 or more, such as about 200 or more, about 300 or more, about 400 or more, about 500 or more, about 750 or more or about 1000 or more charge/discharge cycles.

The use of an anode in a lithium ion battery where the active material includes composites of HCNS and a metal, a metalloid, an alloy, a compound thereof, or any combination of the foregoing, according to any of the embodiments described herein, significantly enhances the performance of the battery. For example, the battery can be charged to substantially higher reversible charge capacities than conventional anodes and achieve very long cycle lives.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention. Patents and publications cited herein are incorporated by reference in their entirety.

EXAMPLES

Example 1—Formation of Composites of HCNS and Germanium

In an exemplary method, composites of HCNS with germanium metal were made as follows.

In an inert atmosphere glove box, 0.466 g 15-crown-5 ether (98% Alfa Aesar) was placed into 50 mL Erlenmeyer flask containing 30 mL of tetrahydrofuran (THF) (previously purified by distillation from NaK alloy). While stirring, 0.0657 g NaK alloy was added to the flask where a dark blue solution immediately formed. The solution was stirred for 45 min to allow the formation of alkalide ($K^+$[15-crown-5-]$_2$$Na^-$) solution.

33.74 mg of HCNS (previously heated at 800° C. for 2 h under $N_2$ gas flow to remove functional groups) was placed into a 125 mL Erlenmeyer flask with 0.279 g of GaI (99.99% Sigma) dissolved in 30 mL of THF. The solution was homogenized for 1 minute by ultrasonic mixing using a Branson 450 Sonifier equipped with ⅛" microtip at 20 kHz and then vigorously magnetically stirred. The alkalide ($K^+$ [15-crown-5-]$_2$$Na^-$) solution was then poured into the solution of GaI and HCNS. A dark brown precipitate immediately formed.

The product was separated from the THF by centrifugation and decantation and then washed with 10% HCl aqueous solution to remove by-products. The HCNS/Ge composite sample was dried under dynamic vacuum overnight.

Example 2—Formation and Testing of HCNS/Ge Composite Electrode Containing Cells

In this example, HCNS/Ge composite was combined with carbon black (Super C45™, obtained from Timcal America Ltd, Westlake, Ohio) at a mass percentage of 80% HCNS/Ge, 10% carbon black and 10% polyacrylic acid (average molecular weight ~1,800, available from Aldrich Chemical Company Inc., Milwaukee, Wis.) binder and a 10% v/v ethanol aqueous solution was added to make a viscous slurry.

The slurry was homogenized by agitation in a Wig-L-Bug™ grinding mill (available from Reflex Analytical Corporation) for 2 minutes. The resultant homogenized slurry was then cast on a copper current collector (99.9% pure copper, available from Alfa Aesar, Ward Hill, Mass.), using a custom doctor blade set-up, to form a circular active material of the electrode composition with a diameter of about {fraction (7/16)} inch. The electrode was then dried at 150° C. for 2 hours. The areal mass loading of the electrode, not including the copper current collector, was 1.25 mg/cm$^2$.

The cell assembly and charge/discharge cycling tests were conducted in argon-filled dry boxes, fitted with re-circulating systems to keep oxygen and water content within the dry boxes below about 1 ppm. The electrode was assembled as a 2016 coin cell with Li metal disc (15.6 mm diameter, available from MTI Corporation) as the counter electrode separated from the working electrode by a porous polymer membrane (Celgard™ 2325, Celgard Inc., Charlotte, N.C.). The electrolyte used was 1 M LiPF$_6$ (available from Novolyte Technologies) dissolved in diethylecarbonate (Novolyte):monofluoroethylene carbonate (F1EC, provided by Solvay SA) (1:1 m/m). The cell was connected in a conventional manner to a battery test system.

The charge/discharge cycles were controlled and measured using a Model BT2000 battery testing system available from Arbin Instruments (College Station, Tex.). The cells were cycled at about 25° C. and were first charged (i.e., lithium loaded into the active material of the working electrode) at a constant current corresponding to a rate of approximately C/5 (i.e. a rate corresponding to a 5 hour charge or discharge) to a cut-off voltage of 20 mV vs. lithium metal and then the cell was rested for 1 h. Discharging (removal of lithium from the active material of the working electrode) was carried out at a constant current of approximately C/5 to a cut-off voltage of 1.5 V vs. lithium metal.

The cells were then rested for 1 hour, completing one cycle. Subsequent cycles were run using the same charging and discharging procedures as the first cycle.

Figure 3:
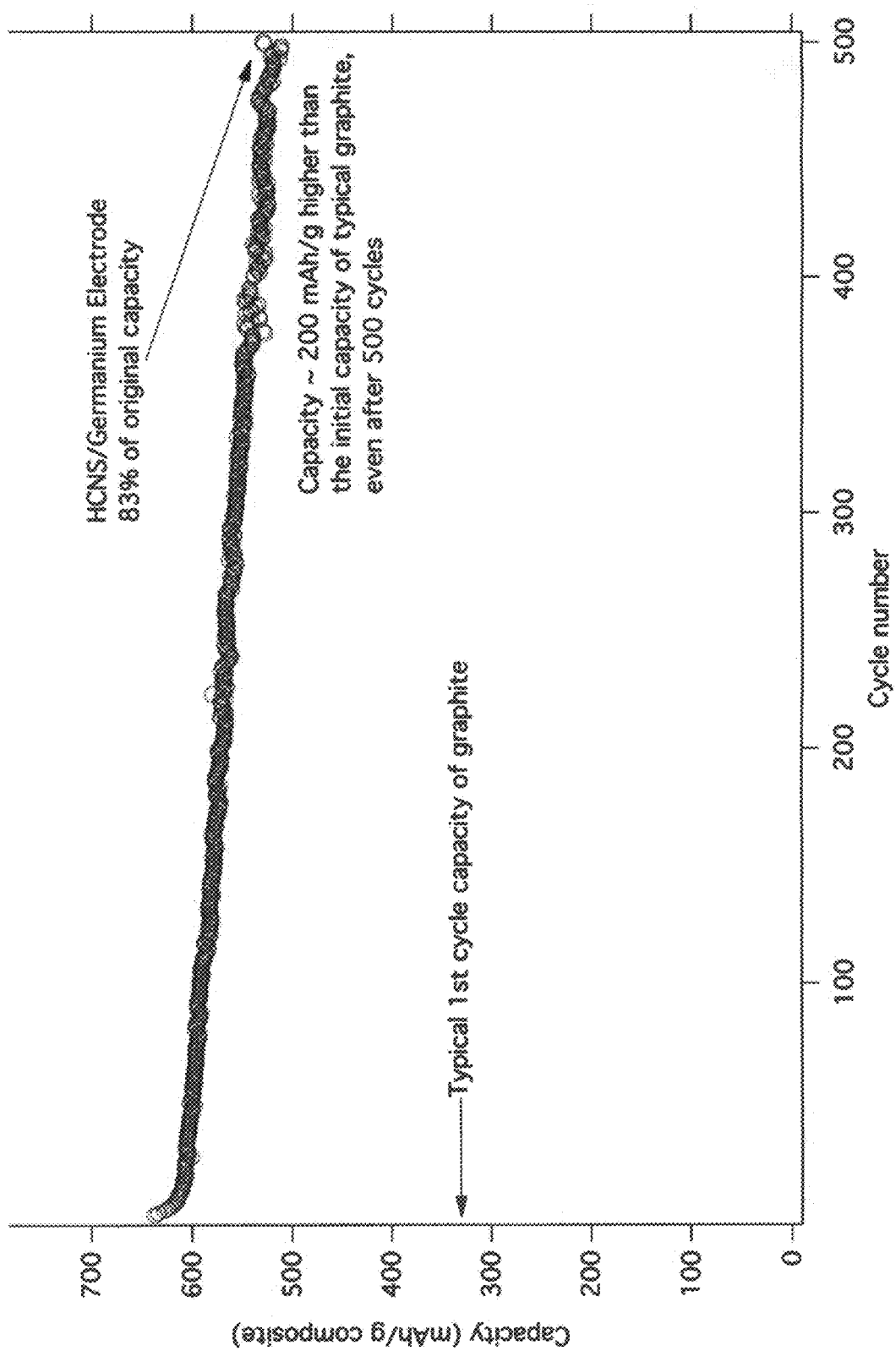
FIG. 3 is a diagram showing the reversible capacity of an electrode prepared from a composite of hollow carbon nanospheres (HCNS) and germanium.

The measured data for the HCNS/Ge cell are provided in FIG. 3. The reversible capacity of the HCNS electrode is initially over 637 mAh/g, nearly twice that of graphite (theoretical maximum of 372 mAh/g, ~330 mAh/g practical first cycle capacity) typically used as the active material for lithium ion battery anodes. Furthermore, the HCNS/Ge cell capacity is maintained at a very high level even after 500 charge discharge cycles, ~200 mAh/g higher than the practical 1$^{st}$ cycle capacity of graphite. The advantage of HCNS/Ge based anodes is even greater when one considers that graphite anodes suffer from significant charge capacity lose (fade) and will have markedly less than their initial charge capacity after 500 cycles.

Figure 4:
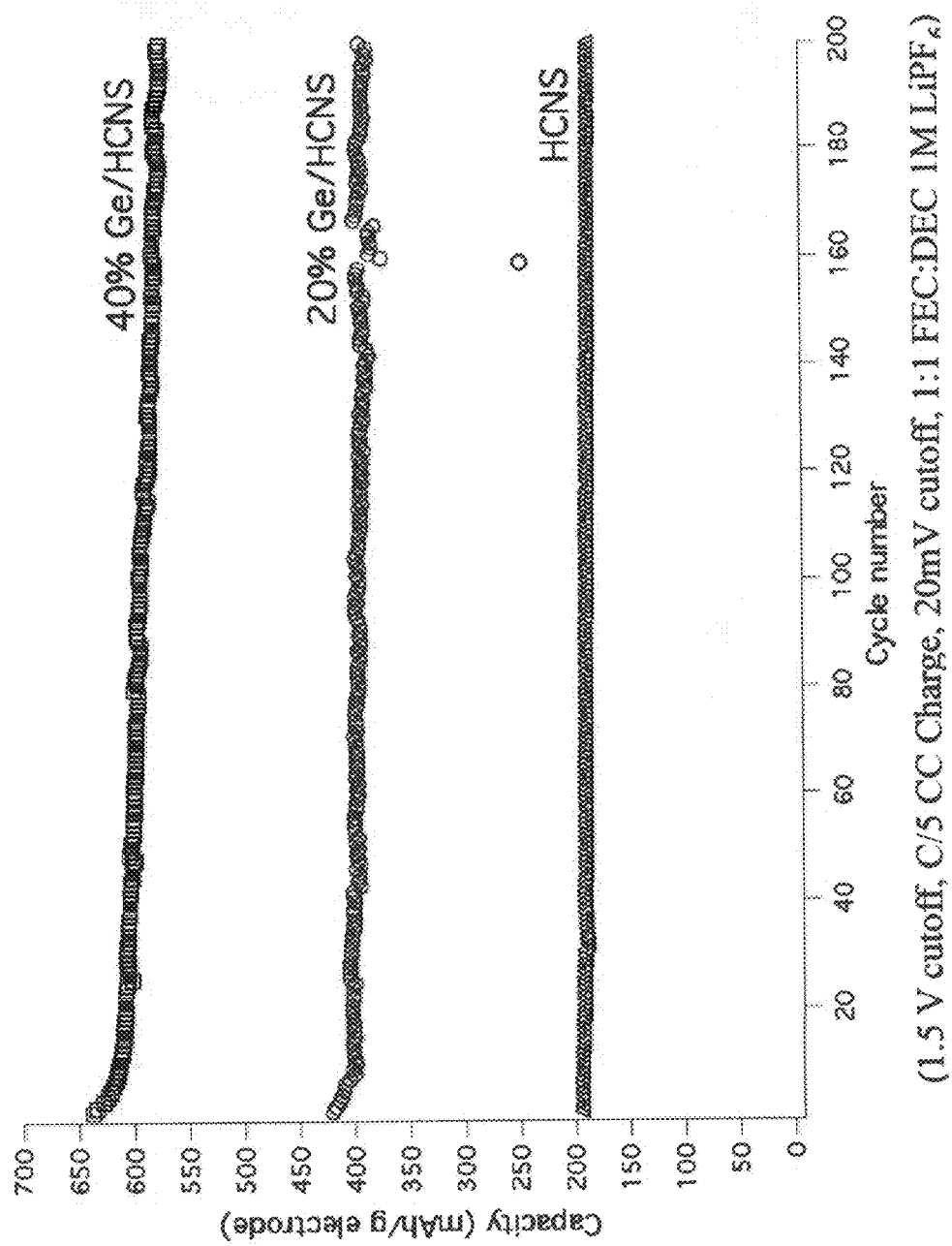
FIG. 4 is a diagram showing the reversible capacity of an electrode prepared from a composite of hollow carbon nanospheres (HCNS) alone, or with 20 wt. % or 40 wt. % germanium.

FIG. 4 shows the reversible capacity of an electrode prepared from a composite of hollow carbon nanospheres (HCNS) alone, or with 20 wt. % or 40 wt. % germanium.

Figure 5:
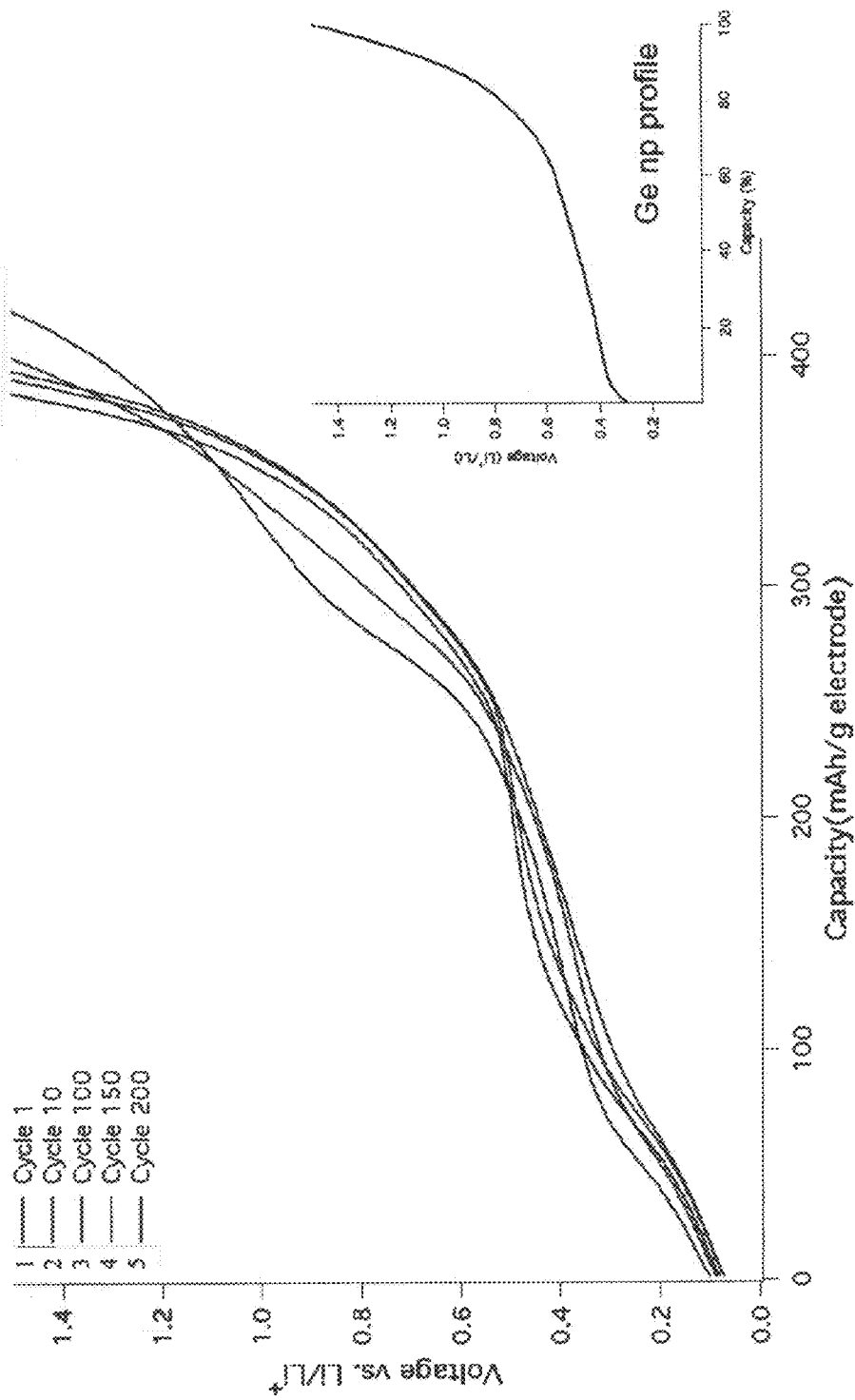
FIG. 5 is a diagram showing the discharge profile of an electrode prepared from a composite of hollow carbon nanospheres (HCNS) and 20 wt. % germanium over 1, 10, 100, 150 and 200 cycles.

FIG. 5 shows the discharge profile of an electrode prepared from a composite of hollow carbon nanospheres (HCNS) and 20 wt. % germanium over 1, 10, 100, 150 and 200 cycles.

Figure 6:
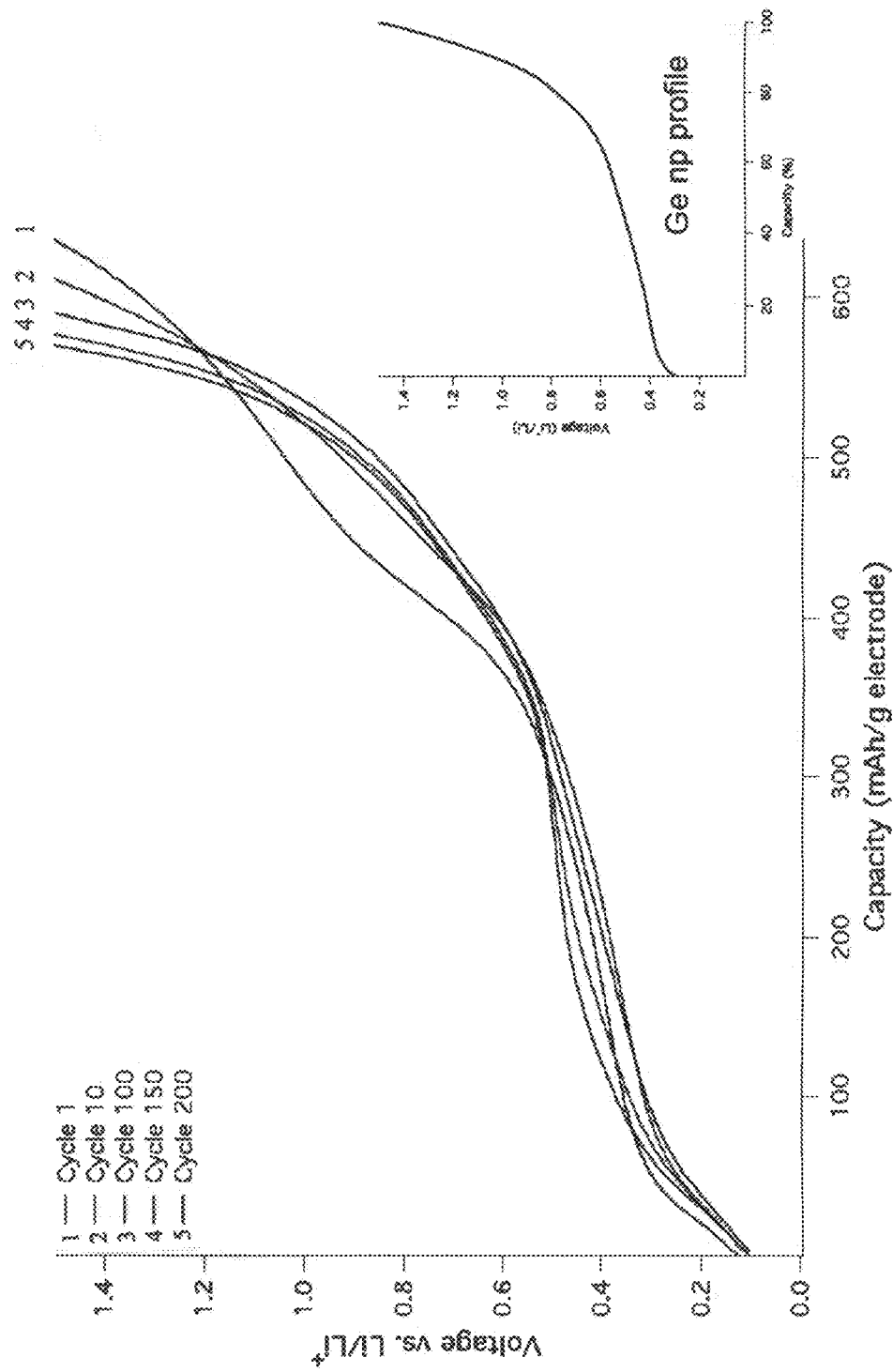
FIG. 6 is a diagram showing the discharge profile of an electrode prepared from a composite of hollow carbon nanospheres (HCNS) and 40 wt. % germanium over 1, 10, 100, 150 and 200 cycles.

FIG. 6 shows the discharge profile of an electrode prepared from a composite of hollow carbon nanospheres (HCNS) and 40 wt. % germanium over 1, 10, 100, 150 and 200 cycles.

Figure 7:
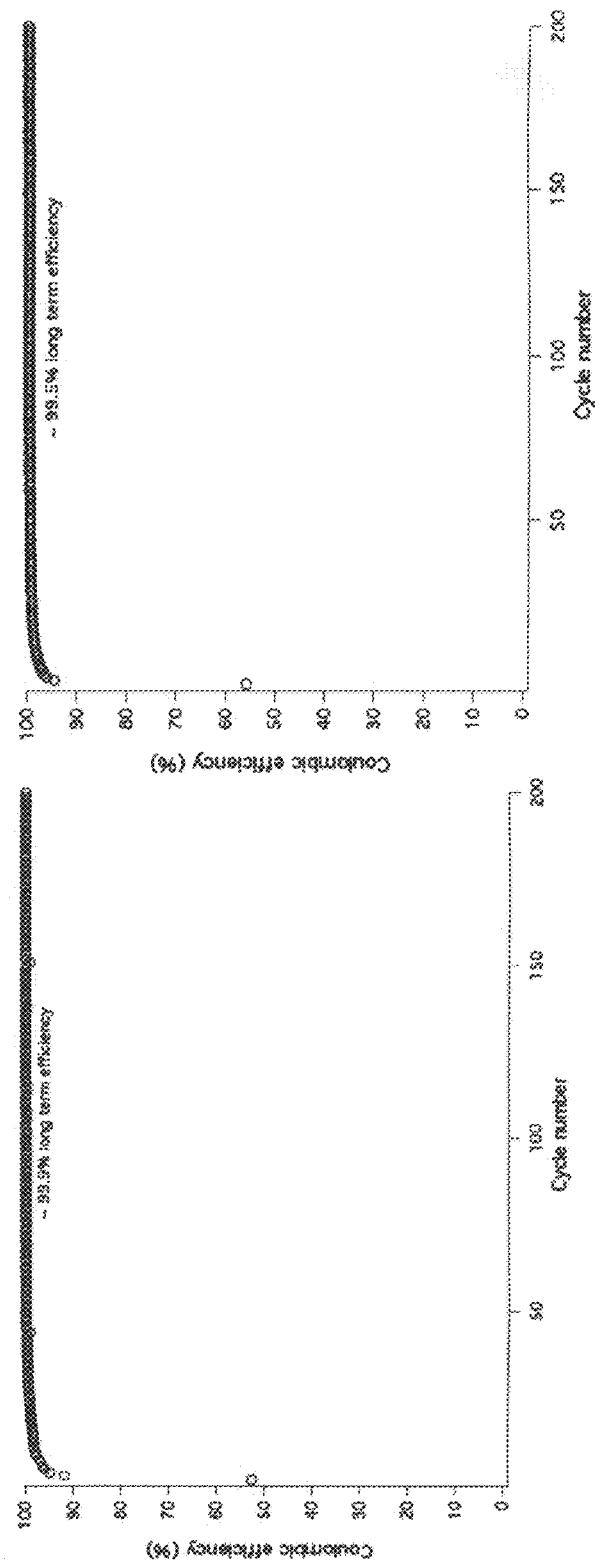
FIG. 7 is a diagram showing the coulombic efficiency an electrode prepared from a composite of hollow carbon nanospheres (HCNS) and 20 wt. % or 40 wt. % germanium.

FIG. 7 shows the coulombic efficiency an electrode prepared from a composite of hollow carbon nanospheres (HCNS) and 20 wt. % or 40 wt. % germanium.

Example 3—Formation and Testing of HCNS/Si Composite Electrode Containing Cells

For this example, an electrode was made in a manner identical to those in Example 2 except that a composite of HCNS and the metalloid silicon (Si) was used instead of the HCNS/Ge.

The electrode was cast from a slurry of HCNS/Si composite (45 mg HCNS and 30 mg Si), 5 mg Super C45™ and 20 mg polyacrylic acid. The areal mass loading of the electrode, not including the copper current collector, was 1.34 mg/cm$^2$. The cell was assembled in a manner identical to those in Example 2 except the electrolyte used was 1 M LiPF$_6$ (available from Novolyte Technologies) dissolved in a mixture of diethylecarbonate and dimethylcarbonate (1:1 m/m, available from Aldrich Chemical Company Inc., Milwaukee, Wis.) and 10% v/v monofluoroethylene carbonate (F1EC, provided by Solvay SA).

The cell was cycled at about 25° C. and were first charged (i.e., lithium loaded into the active material of the working electrode) at a constant current corresponding to a rate of approximately ~C/20 (corresponding to a 20 hour charge or discharge) to a cut-off voltage of 20 mV vs. lithium metal and then the cell was rested for 1 h. Discharging (removal of lithium from the active material of the working electrode) was carried out at a constant current of approximately ~C/20 to a cut-off voltage of 1.5 V vs. lithium metal.

The cells were then rested for 1 hour, completing one cycle. This first "slow" cycle is sometimes referred to as a "formation cycle", allowing for more stable subsequent cycles that were performed at a rate of C/5 instead or C/20 but otherwise in an identical manner as the first.

The measured data for the cell are provided in FIG. 8. As can be seen from FIG. 8, the reversible capacity of the electrode exceeds even that of the HCNS/Ge electrode of Example 2, achieving 1382 mAh/g composite reversible capacity for the first cycle, more than 4 times that typical of graphite. Decreasing the rate to C/5 on the second cycle decreased the reversible capacity to >1100 mAh/g, more than 3 times that typical of graphite. Furthermore, the reversible capacity is stable over many cycles with little capacity fade.

What is claimed is:

1. An ion storage material comprising (a) a composite of hollow carbon nanosphere material and (b) a metal, a metalloid, an alloy, a compound thereof, or any combination of the foregoing;
   wherein the metal, metalloid, alloy, compound thereof, or any combination of the foregoing, is selected from the group consisting of As, Si, Ge, Ga, GaAs, Sn, Pb, Bi, Zn, Te, Sb, Al, In, Cd, Au, Ag, V, Mo, W, Nb, Ta, and Ti, and any combination of the foregoing, a chalcogenide thereof, a pnictide thereof, a halide thereof, a boride thereof, and any combination of the foregoing; and
   wherein the metal, metalloid, alloy, a compound thereof, or any combination of the foregoing is located in interstices between the hollow carbon nanosphere material.

2. The ion storage material of claim 1, wherein the weight percentage of hollow carbon nanosphere composite within the ion storage material is not less than about 5%.

3. The ion storage material of claim 1, wherein the weight percentage of hollow carbon nanosphere composite within the ion storage material is not less than about 20%.

4. The ion storage material of claim 1, wherein the weight percentage of hollow carbon nanosphere composite within the ion storage material is not less than about 30%.

5. The ion storage material of claim 1, wherein the weight percentage of metal, metalloid, alloy, a compound thereof, or any combination of the foregoing, within the ion storage material is not less than about 5%.

6. The ion storage material of claim 1, wherein the weight percentage of metal, metalloid, alloy, compound thereof, or any combination of the foregoing, within the ion storage material is not less than about 20%.

7. The ion storage material of claim 1, wherein the weight percentage of metal, metalloid, alloy, compound thereof, or any combination of the foregoing, within the ion storage material is not less than about 30%.

8. The ion storage material of claim 1, wherein the metal, metalloid, alloy, a compound thereof, or any combination of the foregoing, is selected from the group consisting of As, Si, Ge, Ga, GaAs, Sn, Pb, Bi, Zn, Te, Sb, Al, In, Cd, Au, and Ag, and any combination of the foregoing, a chalcogenide thereof, a pnictide thereof, a halide thereof, a boride thereof, and any combination of the foregoing.

9. The ion storage material of claim 1, further comprising a binder.

10. The ion storage material claim 9, wherein the binder is selected from polyvinylidene fluoride, hexafluoropropylene, polyethylene, polyethylene oxide, polypropylene, polytetrafluoroethylene, polyacrylates, alginates, substituted derivatives thereof, copolymers thereof, and any combination thereof.

11. The ion storage material of claim 9, wherein the binder is polyacrylic acid.

12. The ion storage material of claim 1, further comprising a carbonaceous material.

13. The ion storage material of claim 12, wherein the carbonaceous material comprises graphite, lamellar graphite, pitch, coal pitch, coke, carbon black and/or other electrical conducting carbon materials, carbon-arc generated soot, and any combination thereof.

14. An electrode comprising the ion storage material of claim 1.

15. A secondary ion battery comprising the electrode of claim 14.

16. The ion storage material of claim 1, wherein the weight percentage of metal, metalloid, alloy, a compound thereof, or any combination of the foregoing, within the ion storage material is not less than about 10%.

17. The ion storage material of claim 1, wherein the weight percentage of metal, metalloid, alloy, a compound thereof, or any combination of the foregoing, within the ion storage material is not less than about 15%.

18. The ion storage material of claim 1, wherein the weight percentage of metal, metalloid, alloy, a compound thereof, or any combination of the foregoing, within the ion storage material is not less than about 25%.

19. The ion storage material of claim 1, wherein the metal, metalloid, alloy, compound thereof, or any combination of the foregoing, is selected from the group consisting of As, Si, Ge, Ga, GaAs, Pb, Bi, Zn, Te, Sb, Al, In, Cd, Au, Ag, V, Mo, W, Nb, Ta, and Ti, and any combination of the foregoing, a chalcogenide thereof, a pnictide thereof, a halide thereof, a boride thereof, and any combination of the foregoing.

20. A lithium ion storage material comprising (a) a composite of hollow carbon nanosphere material and (b) a metal, a metalloid, an alloy, a compound thereof, or any combination of the foregoing;
wherein the metal, metalloid, alloy, compound thereof, or any combination of the foregoing, is selected from the group consisting of As, Si, Ge, Ga, GaAs, Sn, Pb, Bi, Zn, Te, Sb, Al, In, Cd, Au, Ag, V, Mo, W, Nb, Ta, and Ti, and any combination of the foregoing, a chalcogenide thereof, a pnictide thereof, a halide thereof, a boride thereof, and any combination of the foregoing; and
wherein the metal, metalloid, alloy, a compound thereof, or any combination of the foregoing is located in interstices between the hollow carbon nanosphere material.

21. The lithium ion storage material of claim 20, wherein the weight percentage of hollow carbon nanosphere composite within the ion storage material is not less than about 5%.

22. The lithium ion storage material of claim 20, wherein the weight percentage of hollow carbon nanosphere composite within the ion storage material is not less than about 20%.

23. The lithium ion storage material of claim 20, wherein the weight percentage of hollow carbon nanosphere composite within the ion storage material is not less than about 30%.

24. The lithium ion storage material of claim 20, wherein the weight percentage of metal, metalloid, alloy, compound thereof, or any combination of the foregoing, within the ion storage material is not less than about 5%.

25. The lithium ion storage material of claim 20, wherein the weight percentage of metal, metalloid, alloy, compound thereof, or any combination of the foregoing, within the ion storage material is not less than about 20%.

26. The lithium ion storage material of claim 20, wherein the weight percentage of metal, metalloid, alloy, a compound thereof, or any combination of the foregoing, within the ion storage material is not less than about 30%.

27. The lithium ion storage material of claim 20, wherein the ef metal, metalloid, alloy, a compound thereof, or any combination of the foregoing, is selected from the group consisting of As, Si, Ge, Ga, GaAs, Sn, Pb, Bi, Zn, Te, Sb, Al, In, Cd, Au, and Ag, and any combination of the foregoing, a chalcogenide thereof, a pnictide thereof, a halide thereof, a boride thereof, and any combination of the foregoing.

28. The lithium ion storage material of claim 20, further comprising a binder.

29. The lithium ion storage material claim 28, wherein the binder is selected from polyvinylidene fluoride, hexafluoropropylene, polyethylene, polyethylene oxide, polypropylene, polytetrafluoroethylene, polyacrylates, alginates, substituted derivatives thereof, copolymers thereof, and any combination thereof.

30. The lithium ion storage material of claim 28, wherein the binder is polyacrylic acid.

31. The lithium ion storage material of claim 20, further comprising a carbonaceous material.

32. The lithium ion storage material of claim 20, wherein the carbonaceous material comprises graphite, lamellar graphite, pitch, coal pitch, coke, carbon black and/or other electrical conducting carbon materials, carbon-arc generated soot, and any combination thereof.

33. An electrode comprising the lithium ion storage material of claim 20.

34. A secondary ion battery comprising the electrode of claim 33.

35. The lithium ion storage material of claim 20, wherein the metal, metalloid, alloy, compound thereof, or any combination of the foregoing, is selected from the group consisting of As, Si, Ge, Ga, GaAs, Pb, Bi, Zn, Te, Sb, Al, In, Cd, Au, Ag, V, Mo, W, Nb, Ta, and Ti, and any combination of the foregoing, a chalcogenide thereof, a pnictide thereof, a halide thereof, a boride thereof, and any combination of the foregoing.

* * * * *